Patented July 8, 1947

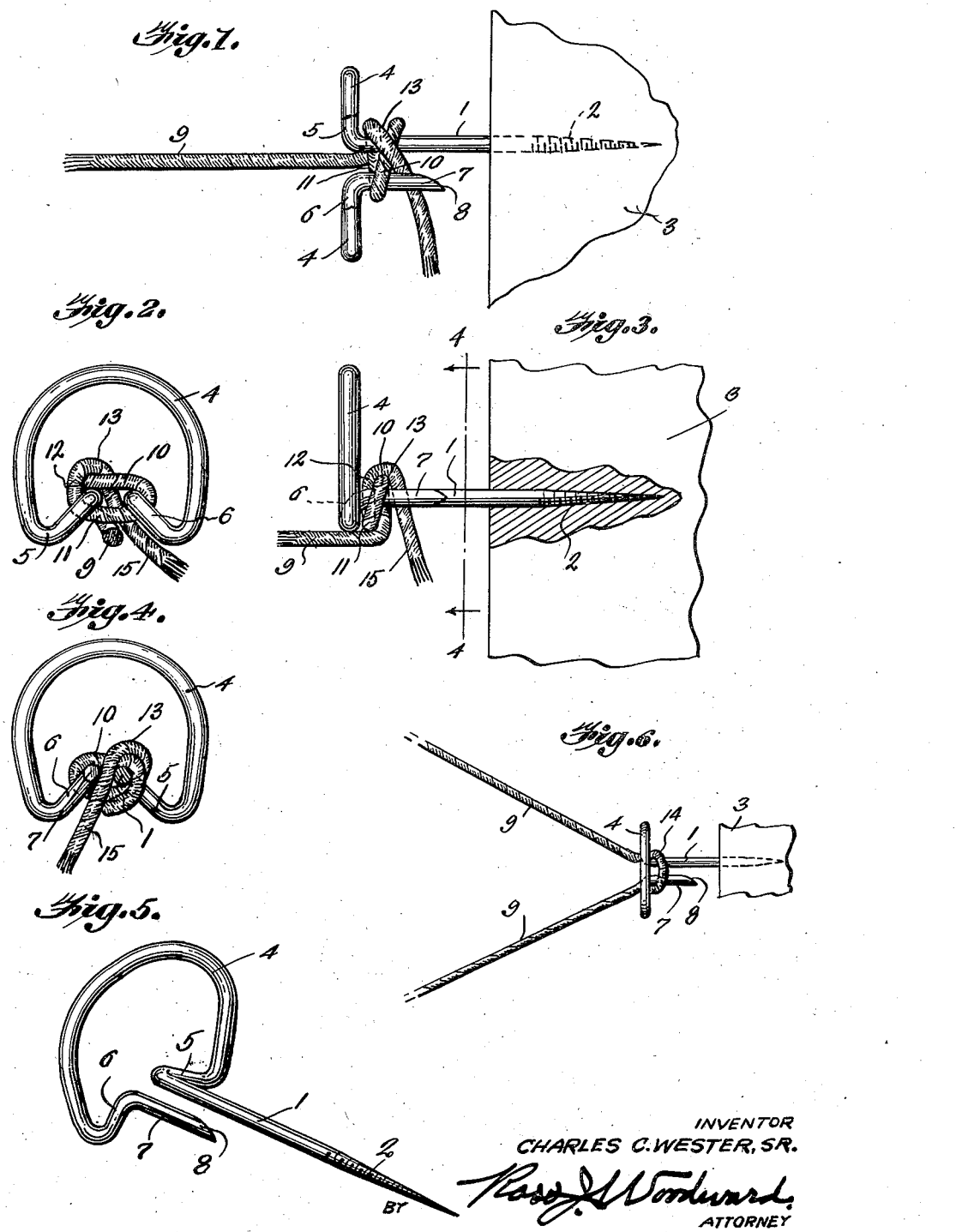

2,423,536

UNITED STATES PATENT OFFICE 2,423,536

HOOK FOR HOLDING CLOTHESLINES OR THE LIKE

Charles C. Wester, Sr., Washington, D. C.

Application November 16, 1945, Serial No. 629,150

4 Claims. (Cl. 24—131)

This invention relates to a hook and it is one object of the invention to provide a hook which is adapted to be mounted upon a post or other support and projects outwardly therefrom, the hook being so formed that a clothes line, rope, cable or the like may be engaged with the hook and firmly secured without a knot being formed in the rope or cable.

Another object of the invention is to provide the hook with an outer portion so formed that when a line or rope is engaged therewith it may be tightly stretched without likelihood of slipping out of engagement with the hook and then firmly secured without slipping and losing any of the tension applied to it.

Another object of the invention is to provide a hook which is of simple construction and very efficient in operation.

The invention is illustrated in the accompanying drawing wherein:

Fig. 1 is a top plan view showing the improved hook applied to a support in position for use and a line connected with the hook.

Fig. 2 is a front view of the hook.

Fig. 3 is a side view of the hook, a portion of the support being shown in section.

Fig. 4 is a view taken along the line 4—4 of Figure 3.

Fig. 5 is a perspective view of the hook.

Fig. 6 is a top plan view upon a reduced scale showing an intermediate portion of a line engaged with the improved hook.

This improved hook is formed from a strand of resilient wire. The strand of wire is straight for a portion of its length to form the shank 1 of the hook and this shank has a tapered and threaded rear end portion, as shown at 2, so that it may be screwed into a post or other suitable support 3. It will be understood that the shank may terminate in a foot instead of a threaded rear end portion and be secured to the support by nails, screws, or in other desired manner.

The forward portion of the wire strand is bent to form an upstanding head 4 which is of inverted U-shaped formation and disposed transversely of the shank with its arms spaced from opposite sides of the shank. At lower ends of its arms the head has portions 5 and 6 which extend inwardly from the arms toward each other at an upward incline in converging relation to each other. The portion 5 is integrally united with the front end of the shank 1 and the portion 6 is integrally united with an arm 7 formed by bending the extreme forward end portion of the strand rearwardly. The arm 7 is in spaced parallel relation to the confronting side of the shank and forms a movable jaw which cooperates with a stationary jaw formed by the forward portion of the shank for gripping engagement with a line or cable and has its rear end bevelled, as shown as 8, so that a line or cable will be guided into position between the arm and the shank where it is firmly gripped when the arm or jaw 7 is forced toward the shank.

When the improved hook is in use it is applied to a post or other suitable support and since the head 4 is quite large it may be readily grasped in a person's hand and pressure and turning motion applied so that the threaded rear end portion of the shank will be screwed into the post. Turning movement is stopped with the head 4 in an upstanding position. The clothes line, rope or flexible cable 9 is secured at one end in any desired manner to a suitable support and is then led towards the hook and after being passed under to portion 5 is brought upwardly and across the shank and the jaw 7, as shown at 10, and downwardly back of the portion 6 and then across the under surfaces of the jaw and the shank, as shown at 11, pull being exerted to tighten the rope. The portion 11 of the rope or line extends over the main portion of the rope 9, as shown in figure 2 and the rope is then brought upwardly in front of the portion 10, as shown at 12, and rearwardly across the portion 10, as shown at 13, and the rearwardly extending portion pulled downwardly between the arm or jaw 7 and the stationary jaw formed by the forward portion of the shank 1 which will firmly grip the same and hold the rope or line against slipping. The rope will thus be firmly held and the portions wrapped about the shank and the arm will have binding engagement with each other to assist in preventing slipping and loosening of the line or rope. In case the line or rope is to be strung back and forth between a number of posts before being tied it is engaged with hooks carried by intermediate posts as shown in Figure 6 wherein the line or rope is shown engaged across the shank 1 and the jaw 7, as shown at 14, and under the arms or diagonally extending portions 5 and 6 so that the line may be tightened by pull exerted upon the same. Since the portions 5 and 6 extend inwardly at an upward incline they will guide the rope towards their upper or inner ends and when pull is exerted upon the rope to tighten it there will be little likelihood of the rope slipping out of engagement with the hook. It will be understood that other methods of applying the rope to the shank may be followed, it being important that the rope be wrapped about the shank and the jaw and then forced into place between the shank and the jaw so that it will be gripped and tightly held. When the rope is to be released it is merely necessary to grasp the portion 15 of the rope and pull the rope from between the jaw and the shank and then unwrap it from the shank and the jaw or arm and disconnect it from the hook. It will thus be seen that the rope or cable may be very easily applied to and removed from the improved hook and that when it is applied to the hook it will be firmly held against slipping and prevented from slackening.

Having thus described the invention, what is claimed is:

1. A hook of the character described formed from a strand of resilient metal and comprising a shank adapted to be secured to a support and an upstanding head at a front end of the shank, said head being of inverted U-shaped formation and having a bridge and arms extending downwardly therefrom and at lower ends of its arms being provided with inwardly extending portions extending towards each other inwardly of the head at an upward incline, one of the said upwardly inclined portions having its inner end integrally united with the shank, and the other upwardly inclined portion having a free inner end portion bent to form a rearwardly extending jaw spaced from a confronting side of the shank and terminating in a bevelled rear end face.

2. A hook of the character described formed from a strand of resilient metal and comprising a straight shank adapted to be secured to a support and an upstanding head at a front end of the shank, said head extending upwardly from the shank with portions disposed at opposite sides thereof and, the lower end of said head having portions extending inwardly of the head at an upward incline, one of the said upwardly inclined portions having its inner end integral with the front end of the shank, and the other upwardly inclined portion carrying a jaw extending rearwardly therefrom in spaced and substantially parallel relation to the shank.

3. A hook of the character described comprising a shank having a rear end portion provided with support-engaging means, a head at a front end of said shank extending upwardly from the shank and disposed transversely of the shank with side portions at opposite sides thereof, the head having one side portion connected with the shank and its other side portion free from the shank and provided with a rearwardly extending jaw spaced transversely from a confronting side of the shank.

4. A hook of the character described comprising a shank, and a resileint head at the front end of the shank extending upwardly therefrom and having side portions disposed at opposite sides thereof and at opposite sides of the shank having lower edges extending at an upward incline towards the shank, and a jaw extending rearwardly from the upper end of one of the said upwardly inclined side portions of the head in position for gripping a rope forced between the shank and the jaw after being wrapped about the shank and the jaw.

CHARLES C. WESTER, Sr.

REFERENCES CITED

The following references are of record in the file of this patent:

UNITED STATES PATENTS

| Number | Name | Date |
|---|---|---|
| 2,271,923 | Moork | Feb. 3, 1942 |
| 2,252,243 | Zoppelt | Aug. 12, 1941 |
| 2,299,794 | Carlson | Oct. 27, 1942 |